Patented Feb. 6, 1940

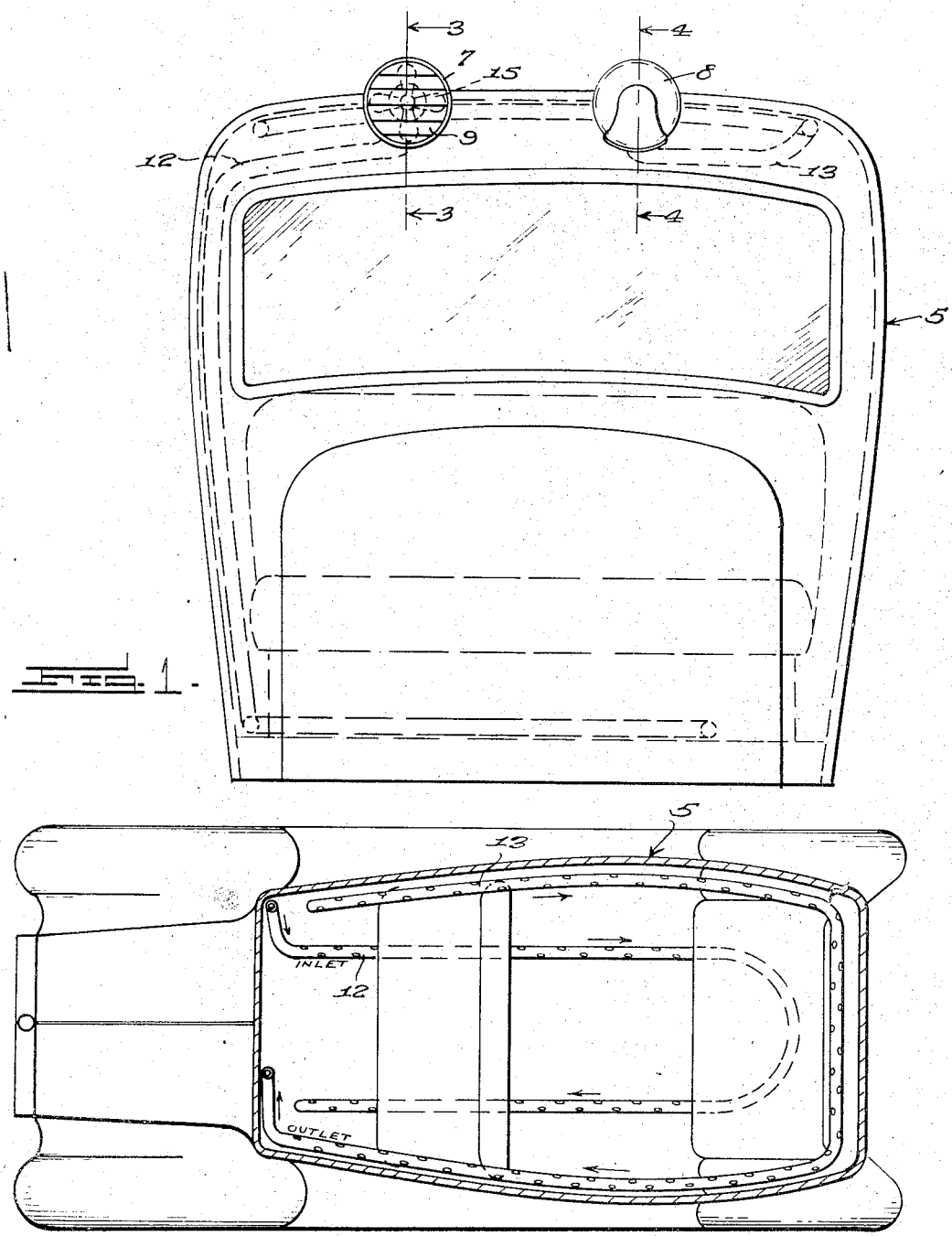

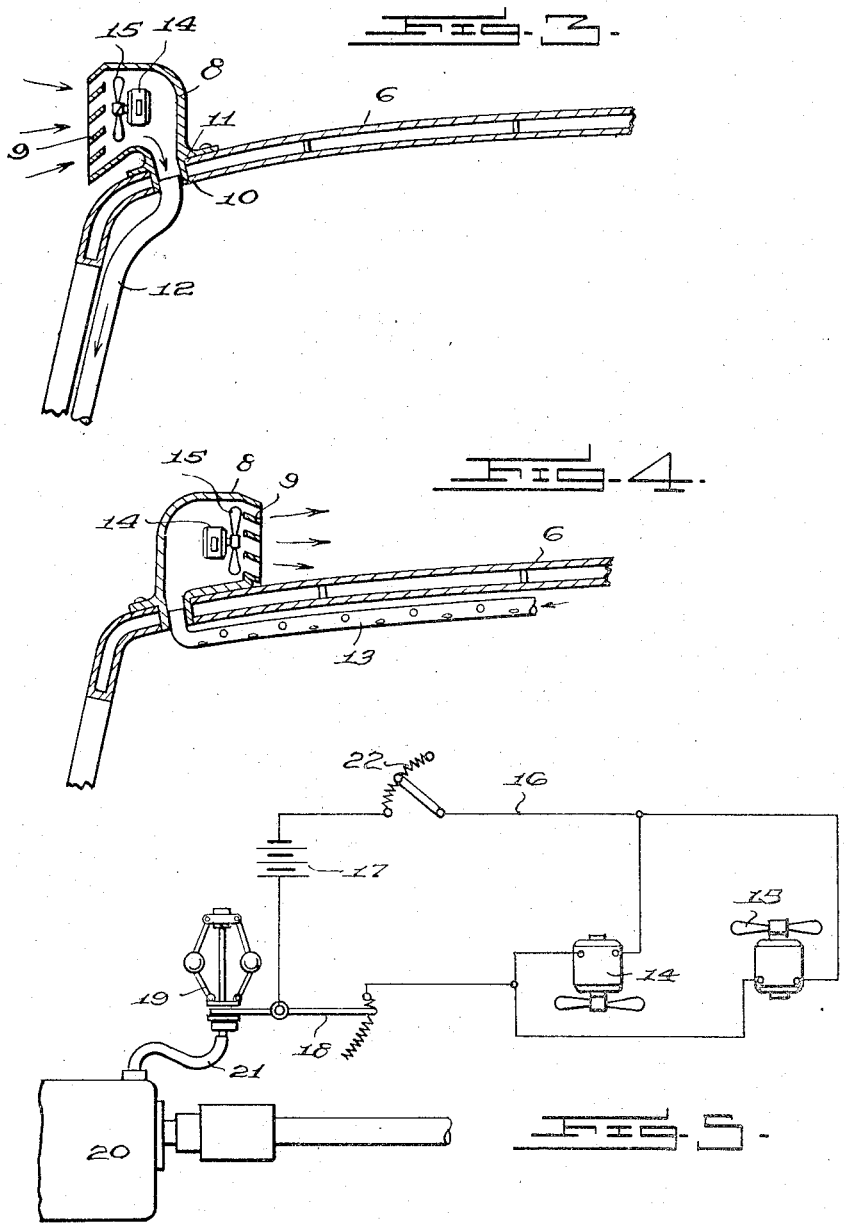

2,189,000

UNITED STATES PATENT OFFICE 2,189,000

VENTILATING DEVICE FOR AUTOMOBILE BODIES

John Esposito, New York, N. Y.

Application October 3, 1938, Serial No. 233,081

1 Claim. (Cl. 98—2)

This invention relates to a ventilating device for automobile bodies, and has for the primary object the provision of a device of this character which will permit delivery into the body of the automobile while standing or running atmospheric air and at the same time remove air from the body so that the air within the body will be kept free of any deadly fumes or gases and from becoming stagnant and unhealthy for the occupants and which allows for the safe operation of the automobile with all windows closed to exclude rain, snow and the like.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a diagrammatical view showing an automobile body equipped with a ventilating device constructed in accordance with my invention.

Figure 2 is a longitudinal sectional view showing the automobile body with the air exchange pipes located therein.

Figure 3 is a fragmentary vertical sectional view showing the air inlet means as being mounted on the top of the body, and taken on line 3—3 of Figure 1.

Figure 4 is a view similar to Figure 3 showing the air outlet means, and taken on the line 4—4 of Figure 1.

Figure 5 is a diagrammatical view illustrating the wiring diagram and a fragmentary portion of the engine of the automobile and a governor driven thereby for the automatic actuation of the control switch of the circuit.

Referring in detail to the drawings, the numeral 5 indicates an automobile body of a conventional construction. The roof 6 thereof has mounted thereon and extending to the interior of the body ventilating casings 7 and 8. The ventilating casing 7 faces forwardly of the automobile body, that is, the opening thereof faces the direction in which the automobile travels while the casing 8 is reversely positioned, that is, the opening thereof faces rearwardly of the direction of travel of the automobile. The openings of the casings 7 and 8 have arranged therein louvers 9 to prevent rain, snow or the like from beating into the casings. Each casing includes a neck 10 which extends through the roof of the body and also an attaching flange 11 secured on the roof in any well known manner to effect a seal between the casing and the roof.

An air inlet pipe 12 is connected to the neck of the casing 7 and extends downwardly in the automobile body and horizontally over the floor thereof with the horizontal portion provided with a series of perforations for the purpose of effectively delivering atmospheric air into the body adjacent the floor. The neck 10 of the casing 8 has connected thereto an outlet pipe 13 which is arranged in the body adjacent the roof and is provided with a series of perforations. The purpose of the outlet pipe is to convey air from the body outwardly thereof by way of the casing 8.

Electric motors 14 are mounted in the casings 7 and 8 and the shafts thereof have secured thereon fans 15. The electric motors 14 are connected in an electric circuit 16 and the source of electrical energy for the circuit is indicated by the character 17 and may be the storage battery of the automobile employed for the illumination of the lights of the automobile. The circuit 16 includes a resistant type switch 18 operated by a governor 19 and the latter has a drive connection to the engine of the automobile. The engine is indicated by the character 20 and the drive of the governor by the character 21.

When the automobile is standing idle or the engine operating at a very slow rate of speed, the governor 19 acts to close the switch 18 of the circuit 16 so as to bring about energization of the motors 14 for driving the fans 15. The fan in the casing 7 draws air therein and forces said air into the body by way of the air inlet pipe 12, while the fan 15 of the casing 8 creates a suction therein drawing the air out of the body by way of the air outlet pipe 13. This brings about an efficient ventilation of the automobile body while the automobile is standing still or operating at a very slow rate of speed. However, as the speed of the automobile increases above a predetermined speed, the governor 19 acts to open the switch 18 and break the electric circuit to stop the operation of the motors 14. The automobile operating at this rate of speed is sufficient to bring about circulation of air through the body by way of the casing 7 and the air inlet pipe 12 and to draw air out of the body by way of the air outlet pipe 13 and the casing 8. Through the arrangement of the governor and switch 18 it will be seen that the automobile body will be efficiently ventilated either when the automobile is standing idle or operating at a very slow speed or when operating at a high rate of speed and sufficient to bring about a circulation of air through the casings 7 and 8 due to the forward travel of the vehicle. With this arrangement electricity will be conserved as it is only utilized when the automobile is standing idle or operating at a very slow rate of speed.

Also located in the circuit 16 is a manually actuated switch 22 for opening and closing the circuit 16 and for permitting operation of the motors 14 at different speeds. This switch is preferably located in convenient reach of the operator of the automobile. It will be seen through the use of the switch 22 the motors may be rendered inoperative when the automobile is left unattended.

Through the employment of the ventilating device shown in the drawings and herein described in detail will permit an efficient ventilation of the automobile body so that the occupants thereof may be rendered comfortable and safe from inhaling dangerous and obnoxious fumes which may enter the automobile body from the engine of the automobile and also prevent the air from becoming stagnant and unhealthy and allows for the safe operation of the automobile with all of the windows in a closed position so that weather elements will be excluded, consequently adding to the comfort of the occupant.

It is believed that the foregoing description, when taken in connection with the drawings will fully set forth the construction and advantages of this invention to those skilled in the art to which such a device relates, so that further detailed description will not be required.

What I claim is:

In combination with an automobile including an engine and a body, casings mounted on the exterior of the body and each having an open side and said casings having the open sides thereof reversely arranged to each other, an air inlet pipe connected to one of said casings and extending into the body, an air outlet pipe connected to the other casing and arranged on the interior of the body, electric motors mounted in said casings, fans operated by said motors, an electric circuit connected to said motors and including a manually controlled switch and an electrical source, and a governor actuated switch of the resistant type for operating the fans at variable speeds and for stopping said fans, a governor whereby said governor in combination with said governor actuated switch will increase and decrease the speeds of the fans in accordance with the decreased and increased speeds of the engine and to stop said fans when said engine is operating faster than a predetermined speed operating the governor type switch, and a drive means between the engine and the governor.

JOHN ESPOSITO.